United States Patent
Szerdahelyi et al.

[11] Patent Number: 6,076,882
[45] Date of Patent: *Jun. 20, 2000

[54] MOTOR VEHICLE DOOR

[75] Inventors: Ferenc Szerdahelyi, Coburg; Manfred Stenzel, Bamberg, both of Germany

[73] Assignee: Brose Fahrzeugteile GmbH & Co. KG Coburg, Coburg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/849,753

[22] PCT Filed: Dec. 14, 1995

[86] PCT No.: PCT/DE95/01837

§ 371 Date: Jun. 12, 1997

§ 102(e) Date: Jun. 12, 1997

[87] PCT Pub. No.: WO96/18515

PCT Pub. Date: Jun. 20, 1996

[30] Foreign Application Priority Data

Dec. 14, 1994 [DE] Germany .............................. 44 44 406

[51] Int. Cl.[7] ...................................................... B60J 5/04
[52] U.S. Cl. .................................. 296/146.1; 296/146.5; 296/146.7; 49/502; 280/730.2
[58] Field of Search .......................... 49/502; 296/146.1, 296/146.5, 146.7, 152; 280/730.2

[56] References Cited

U.S. PATENT DOCUMENTS

| | | | |
|---|---|---|---|
| 2,658,790 | 11/1953 | Fish et al. | 49/502 X |
| 2,707,320 | 5/1955 | Fish | 29/416 |
| 4,469,732 | 9/1984 | Isaksen et al. | 428/80 |
| 4,848,829 | 7/1989 | Kidd | 49/502 X |
| 4,882,842 | 11/1989 | Basson et al. | 29/857 |
| 5,050,350 | 9/1991 | Bertolini et al. | 49/502 |
| 5,095,659 | 3/1992 | Benoit et al. | 49/502 |
| 5,364,125 | 11/1994 | Brown et al. | 280/730 |
| 5,435,596 | 7/1995 | Rose et al. | 280/728.2 |
| 5,715,630 | 2/1998 | Szerdahelyi et al. | 49/502 X |
| 5,857,732 | 1/1999 | Ritchie | 296/146.5 |
| 5,897,134 | 4/1999 | Stein et al. | 280/730.2 X |
| 5,904,002 | 5/1999 | Everling et al. | 49/502 |
| 5,906,072 | 5/1999 | Feige et al. | 49/502 |

FOREIGN PATENT DOCUMENTS

| | | |
|---|---|---|
| 1332620 | 3/1989 | Canada . |
| 0199970 | 12/1986 | European Pat. Off. . |
| 0304769 | 3/1989 | European Pat. Off. . |
| 0492355 | 7/1992 | European Pat. Off. . |
| 3 311 599 | 10/1983 | Germany . |
| 3529660 | 2/1986 | Germany . |
| 3609609 | 10/1987 | Germany . |
| 3928685 | 1/1991 | Germany . |
| 4212261 | 10/1993 | Germany . |
| 59-84621 | 5/1984 | Japan ..................................... 296/502 |
| 64-74976 | 10/1990 | Japan ................................. 296/146.7 |
| 6-305389 | 1/1994 | Japan . |
| 6144011 | 5/1994 | Japan . |
| 2 117 329 | 10/1983 | United Kingdom . |

*Primary Examiner*—D. Glenn Dayoan
*Assistant Examiner*—Jason Morrow
*Attorney, Agent, or Firm*—Christie, Parker & Hale, LLP

[57] ABSTRACT

A motor vehicle door consisting of an outer door panel, an inner door panel and an inner door trim as well as a window pane which can be displaced by means of a window lift. The inner door panel supports functional units, such as a window lift, lock, door handle and/or a side airbag. At least one assembly opening is provided in the inner door panel which is sealed against moisture or spray water by such a functional unit. Alternatively, a door module is provided to seal between the inner and outer door panels, and the door module includes at least one assembly opening to be sealed by such functional units.

21 Claims, 4 Drawing Sheets

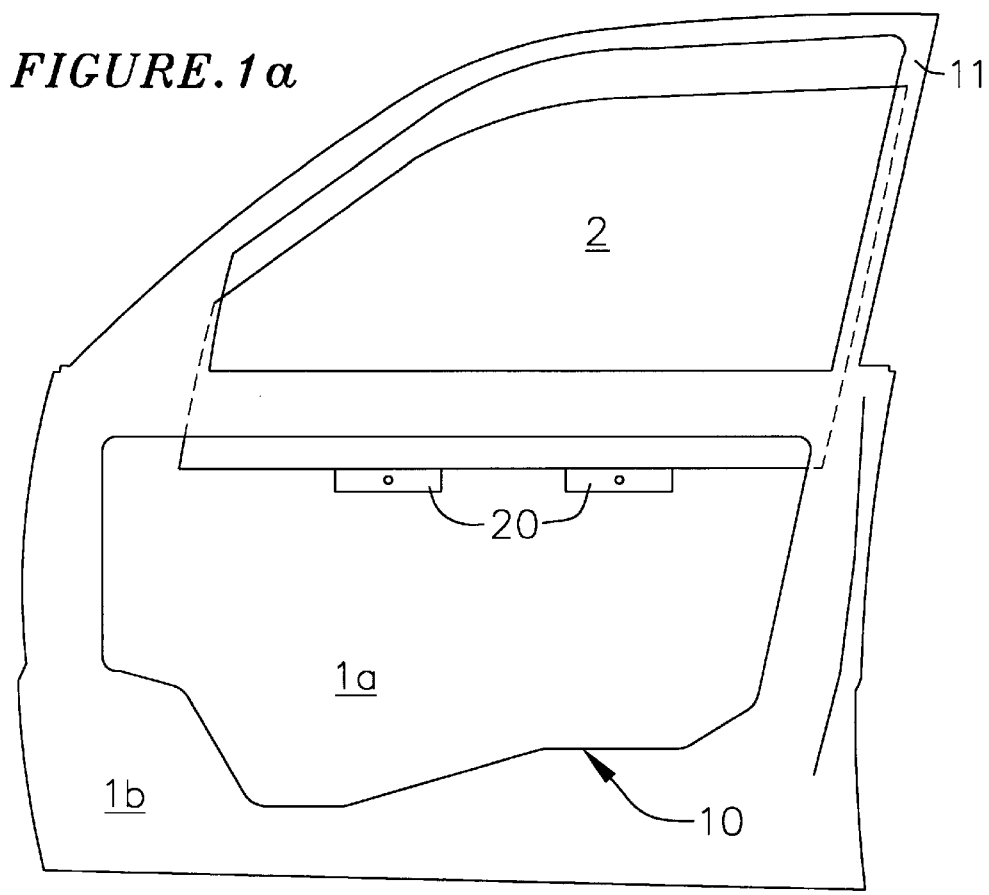
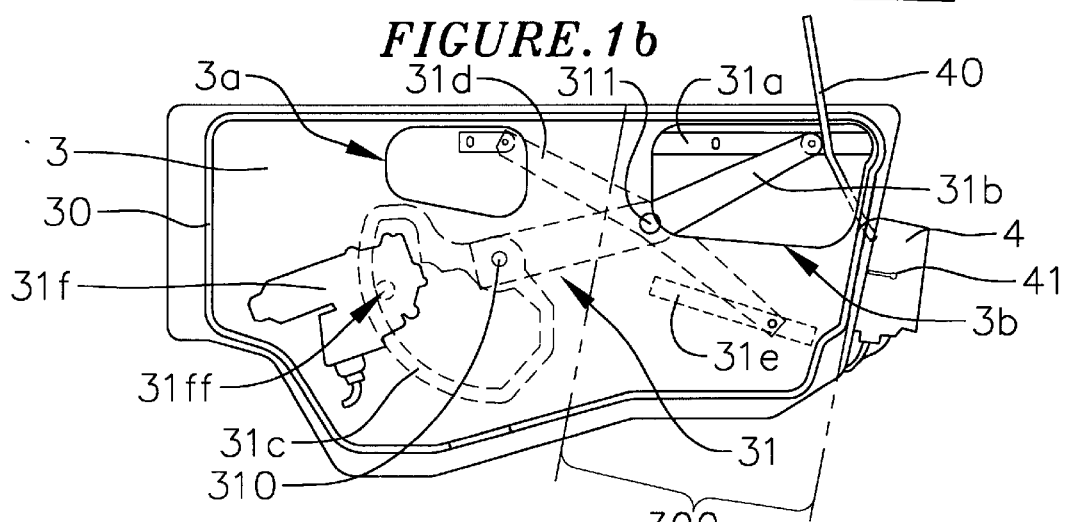
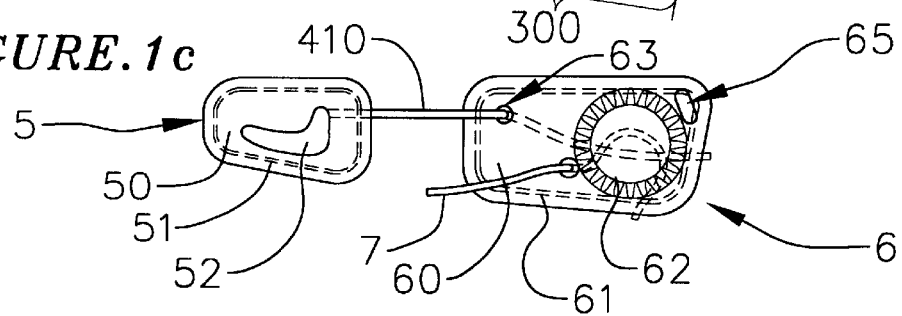

MOTOR VEHICLE DOOR

BACKGROUND OF THE INVENTION

The invention relates in general to a motor vehicle door, and more particularly, to a motor vehicle door having inner and outer door panels and a window assembly opening sealed by a functional unit of the door.

German Patent No. DE-41 12 261 Al describes a motor vehicle door with an outer door panel and an inner door panel having a recess on which a socket part (module support) is mounted. The socket part supports an electric window lift and a cable tree with several plug connections. In the assembled state, the socket part covers the largest area of the opening in the inner door panel. In the upper area of the inside of the door, between the edges of the inner door panel and socket part, is an assembly opening which is provided to allow a window lift to be fitted on a window lift rail, connected to the lower edge of the window pane, during assembly.

The described structural design has the drawback that the recessed part is not of a suitable size and shape to close the outer door area substantially hermetically from the inner door area and thus provide a dry chamber suitable for housing electrical components. Owing to the remaining assembly openings, an additional large surface foil must be used in addition to divert the water.

German Patent No. EP 0 492 355 B discloses a door for a motor vehicle with an assembly support which is cut out of the inner door panel and occupies practically the entire surface of the door body lying under the belt line. Fastening tabs spread out over the circumference on the inner door panel and on the assembly support serve to connect the two parts. However, free spaces remain between adjoining fastening tabs. Several assembly openings are provided in the material of the assembly support which potentially allow for the window winder to be connected to the window pane.

Even with this solution a separate seal is necessary to seal the inner door space from seeping water if one wants to avoid expensive waterproofed designs for the electrical assemblies (e.g. electric motor) and plug connections.

German Patent No. DE 35 29 660 C2 describes a cable tree for a motor vehicle door which is mounted on a support plate of the inner door trim which seals the opening in the inner door panel substantially against water. Only in the lower area of the support plate are two cable guides provided through which an electric motor as well as the central locking are to be provided with energy. However, sealing the cable guides is not provided. Another variation starts from a door with an inner door panel which has some assembly openings and the cable tree is mounted with its plug connections on the inner door trim.

Even these technical solutions have the already described drawbacks regarding the necessity for a separate sealing measure, or expensive wet area designs of the door to protect the electrical components.

German Patent No. DE 39 28 685 C1 discloses a device for fixing a window lift base plate on the inner wall of a vehicle door. A part of the outer circumference of the window lift base plate is connected to a flexible extruded sealing profile which, in the assembled state of the window lift, sealingly adjoins the inner door panel of the vehicle. A recess is provided corresponding to the outline of the window lift base plate. When the window lift base plate is fitted on the inner door panel of the vehicle door, the recess (14) is indeed closed, but in order to adjust the window, additional handles extending through further openings separated from the recess are required.

Japanese Patent No. JP 6-144011 (A) discloses a watertight construction for a motor vehicle door wherein the inside wall of the door is provided with a recess. With this device, a connecting cover is fixed from outside of the closed support plate with sealing material mounted therebetween. Only after fitting further connecting rods are the openings covered inside the inner door panel. These connection rods remain after the connecting cover has been fitted.

Canadian Patent No. CA-A I 332 620 discloses a vehicle door with an outside door panel, an inside door panel, and a door module which can be inserted in the inside wall. The door module supports all the functional units of the vehicle door. An inner door trim is fixed over the door module. In one embodiment a dry space is formed inside the door module and contains a door opener, an electrical control unit, and a loudspeaker. The dry space is formed from a suitably hollowed area of the door module which is not broken through, an area of the inner door trim opposite the hollowed area, and suitable sealing faces between the door module and inner door trim.

However, a locally restricted assembly opening in the door module or in the inner door panel which allows the window lift to be connected to a window pane is not provided.

Accordingly, it is desirable to develop a motor vehicle door with locally restricted assembly openings to facilitate assembly of a window pane on a window lift which, without additional separate sealing means for these assembly openings, allows the door body to be divided into an outer wet chamber and an inner dry chamber with simple assembly, and which allows modular construction of the vehicle door.

SUMMARY OF THE INVENTION

In one embodiment of a motor vehicle door according to the invention, the door includes outer and inner door panels with a door trim interposed between them. The door also includes a window lift for receiving a window pane during assembly. The inner door panel includes one or more assembly openings to facilitate assembly of the window pane on the window lift. Each assembly opening is sealed against moisture and/or water spray by a functional unit typically included in motor vehicle doors.

According to another embodiment, at least one of the assembly openings is closed through a functional unit, that is, for example, a manually operating unit for the door lock, a side airbag, a unit for continuing or distributing drive energy or signals, or another functional unit common to motor vehicle doors.

According to yet another embodiment, an assembly opening, which has to be provided in any case for assembling a window pane on a window lift, is not closed by an otherwise non-functional cover but instead is closed in a cost-effective space-saving manner using a functional unit which is to be provided in any case in the door. Such an existing assembly opening is thereby used in an additional manner and way, namely for holding a functional unit.

According to a further embodiment, the door includes an inner door panel which preferably has a relatively large cut-out section which can be closed in a watertight manner by a module support. The module support has assembly openings which allow, for example, the connection of a window lift with the lower edge of the window pane and are then closed and sealed by a functional unit.

In order to improve the assembly sequences it is advantageous if the functional units are prefitted on the module support and after the assembly openings have fulfilled their function, they are closed in a watertight manner by the functional unit.

The functional units have sufficient mechanical stability to make them suitable for supporting a padding and absorbing accident-conditioned forces to the required extent. When using several functional units, these can be connected together in order to support a component part of the adjoining function unit.

Preferably, all the electrical or electronic components and component parts are mounted in the dry chamber of the door body so that expensive wet chamber designs can be avoided.

DESCRIPTION OF THE DRAWINGS

The invention will now be explained in further detail with reference to the described embodiments and the illustrated drawings in which:

FIG. 1a is a side view of a vehicle door according to one embodiment of the invention with a large cut-out section in the inner door panel;

FIG. 1b is a side view of a module support with two assembly openings as well as an electric window lift (shown in shadow) and central locking unit prefitted thereon;

FIG. 1c is a side view of two functional units, a manual operating unit for a door lock, and a side airbag;

FIG. 2b is a side view of two functional units, a manual operating unit for a door lock and a side airbag for assembly on the door of FIG. 2a.

DETAILED DESCRIPTION OF THE INVENTION

Figure 1D:
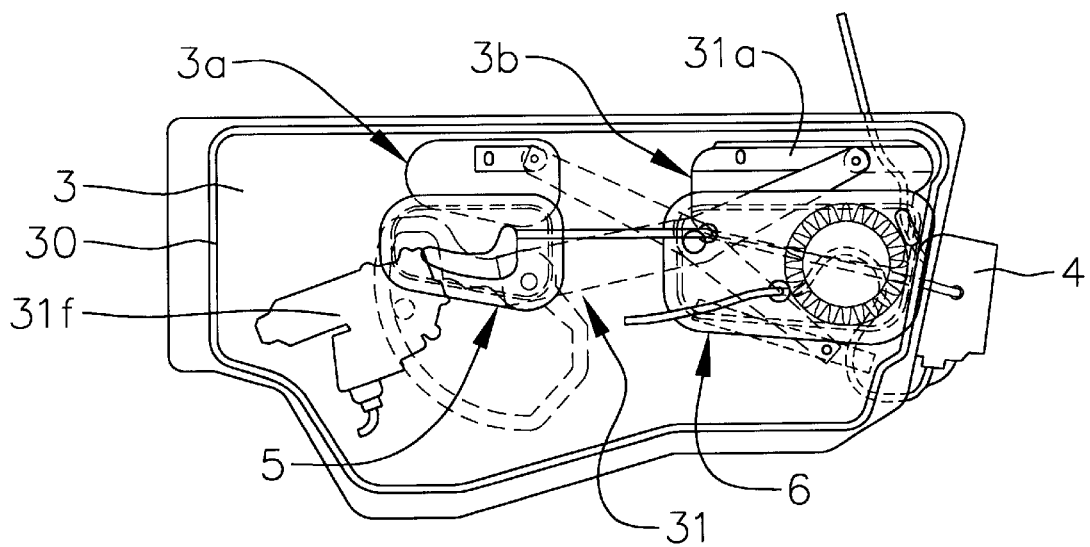
FIG. 1d is a side view of a module support with functional units in a preassembled transport position.

The invention can be used with particular advantage when the vehicle door has a modular structure according to the embodiment of FIGS. 1a and 1b. FIG. 1 shows a side view of the door body which consists of an inner door panel 1b with a large door cutout section, opening 10, through which an outer door panel 1a can be seen. A window frame 11 is provided for guiding a window pane 2. Fixing elements 20 are attached to the lower edge of the window pane to connect with a window lift mechanism 31.

To close the opening 10 in the inner door panel 1b there is a module support 3 on which a window lift mechanism 31 is mounted. The lever arms 31b, 31d of the window lift mechanism 31 are swivel mounted in an articulated joint 311 and are each connected at one end through swivel sliding joints to a lift rail 31a. The opposing end of one lever arm 31d is guided in a guide rail 31e. The opposing end of the other lever arm, which is mounted on a rotary axis 310 connected to the module support 3, is formed as a toothed segment 31c and engages a toothed element of the motorized drive 31f. The window lift mechanism 31 is mounted on the side facing the outer door panel 1a, whereas the motorized drive 31f is located on the other side facing the inner door trim (not shown). Thus the electrical and/or electronic components are in the so-called "dry chamber" of the door body, that is, the portion of the door adjacent the interior of the assembled vehicle and sealed from moisture. The force transfer between the window lift mechanism 31 and the motorized drive 31f is through a drive axle 31ff projecting through the module support 3 and sealed against the inlet of water.

In the upper area of the module support 3 are two assembly openings 3a, 3b through which the connection is made during assembly between the lift rail 31a and the fixing elements 20 of the window pane 2. These assembly openings 3a, 3b are now not closed in the usual way by a foil or by separate cover or the like to protect the inner door space (dry chamber) against moisture, but rather the closure of the assembly openings is provided according to the invention through functional units which are to be provided in any case in the door.

Such functional units can include, for example, with reference to FIG. 1c manual operating means 5 for the door lock; a side airbag 6; an electric drive unit; or a structural group for sending drive energy or signals. Naturally, the various embodiments of the invention are not restricted only to the closing of such assembly openings which are allocated to a crossarm window winder or window lift of another kind. Other embodiments can be used for closing assembly openings of any kind through one or more functional units.

The module support 3 includes on its circumference a seal 30 which provides a water-tight sealing closure in conjunction with the inner door panel. Furthermore, a lock unit 4 is mounted on the module support 3. The lock unit 4 has an engagement point 41 for a rod linkage, or a Bowden cable, 410 for operation. The locking rod 40 projects through the assembly opening 3b from the lock 4 on the so-called "wet chamber" side, that is, the side not sealed from the inlet of water, and is accessible for manual operation on the dry chamber side with its upper free end.

The embodiment shown in FIG. 1c provides a manual operating unit 5 for a door lock as well as a side airbag 6 as functional units for closing the assembly openings 3a, b. According to this embodiment, the manual operating unit 5 consists basically of a bearing shell 50 which supports a seal 51 and an operating handle 52, wherein the latter is connected after assembly through the rod linkage, or Bowden cable, 410 at the engaging point 41 with the door lock 4.

The side airbag 6 consists basically of a bearing shell 60 with seal 61 and airbag module 62. Furthermore three openings 63, 64, 65 are provided for passing through component parts which are likewise to be sealed against moisture or at least protected against spray water. Thus the opening 63 serves to provide passage for the rod linkage 410 from the handle 52 to the door lock 4 mounted in the wet chamber. Through the opening 64 is passed a cable 7 which likewise supplies the lock 4 and thus guarantees the functioning of the central locking. The opening 65 serves solely for passing through the locking rod 40 from the dry chamber to the wet chamber.

The bearing shells 50, 60 and the modular support 3 have a stable construction (particularly in the area 300) so that they can withstand the forces exerted on them by the surrounding portions of the door in the event of an accident. Accordingly, the danger of injury through accident or the degree of seriousness of such injuries can be reduced.

Figure 1E:
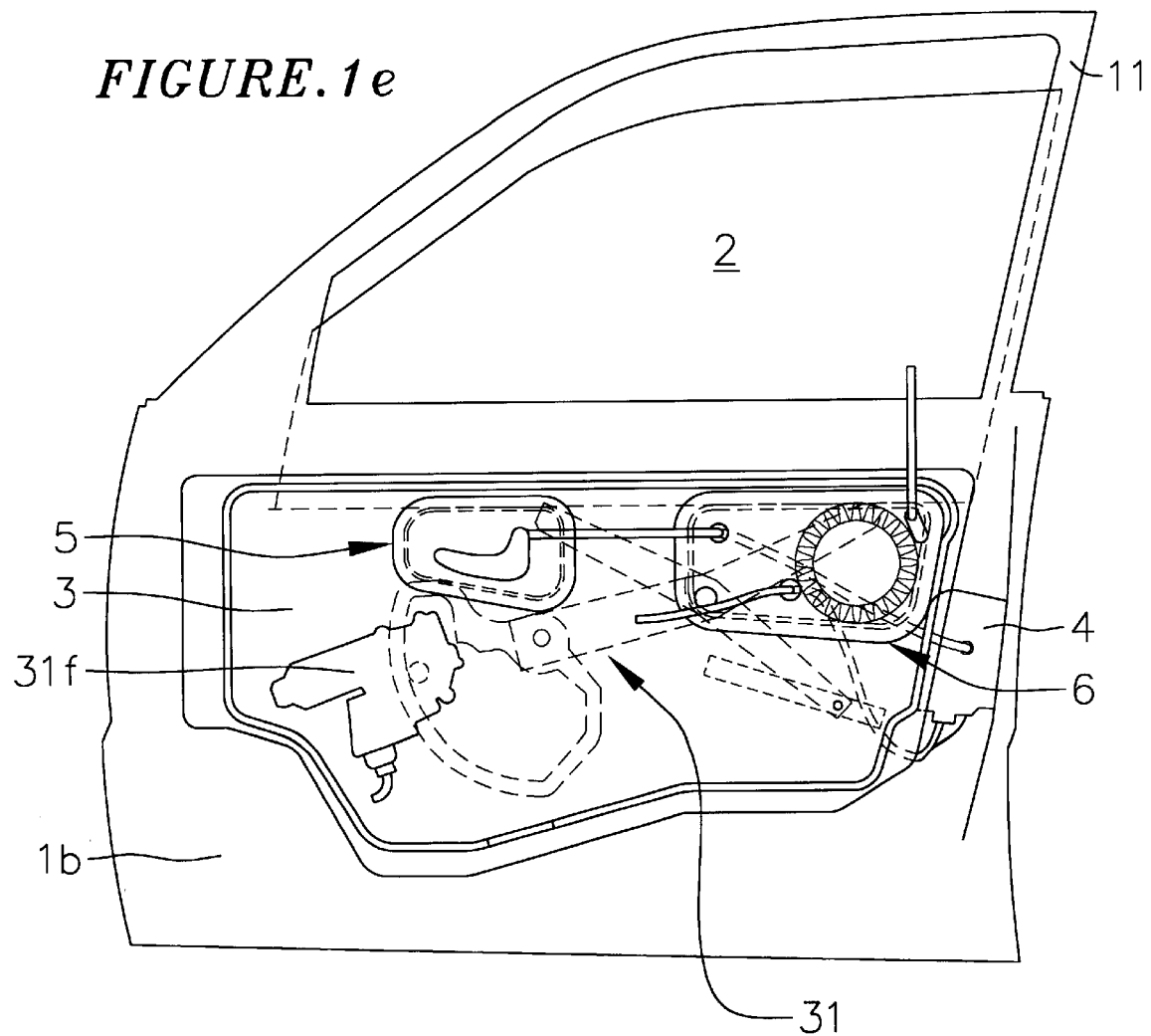
FIG. 1e is a side view of a vehicle door in the finished assembled state wherein all component parts are located in functional, fully assembled positions.

FIG. 1d shows the functional units 5,6 in a preassembled transport state on the module support 3 wherein the assembly openings 3a, 3b are covered only so far to facilitate a problem-free assembly of the window lift 31. The illustrated module has a high degree of integration and is suitable to allow considerable improvements regarding the assembly sequence and thus also a cost saving. The functional units 5,6 have a double function; in addition to their actual useful purpose they serve to close the assembly openings 3a,3b. Separate measures for sealing are thereby saved. After assembly of all the structural groups and functional units 5,6 in the door body, they are located in the functioning position shown in FIG. 1e.

Figure 1F:
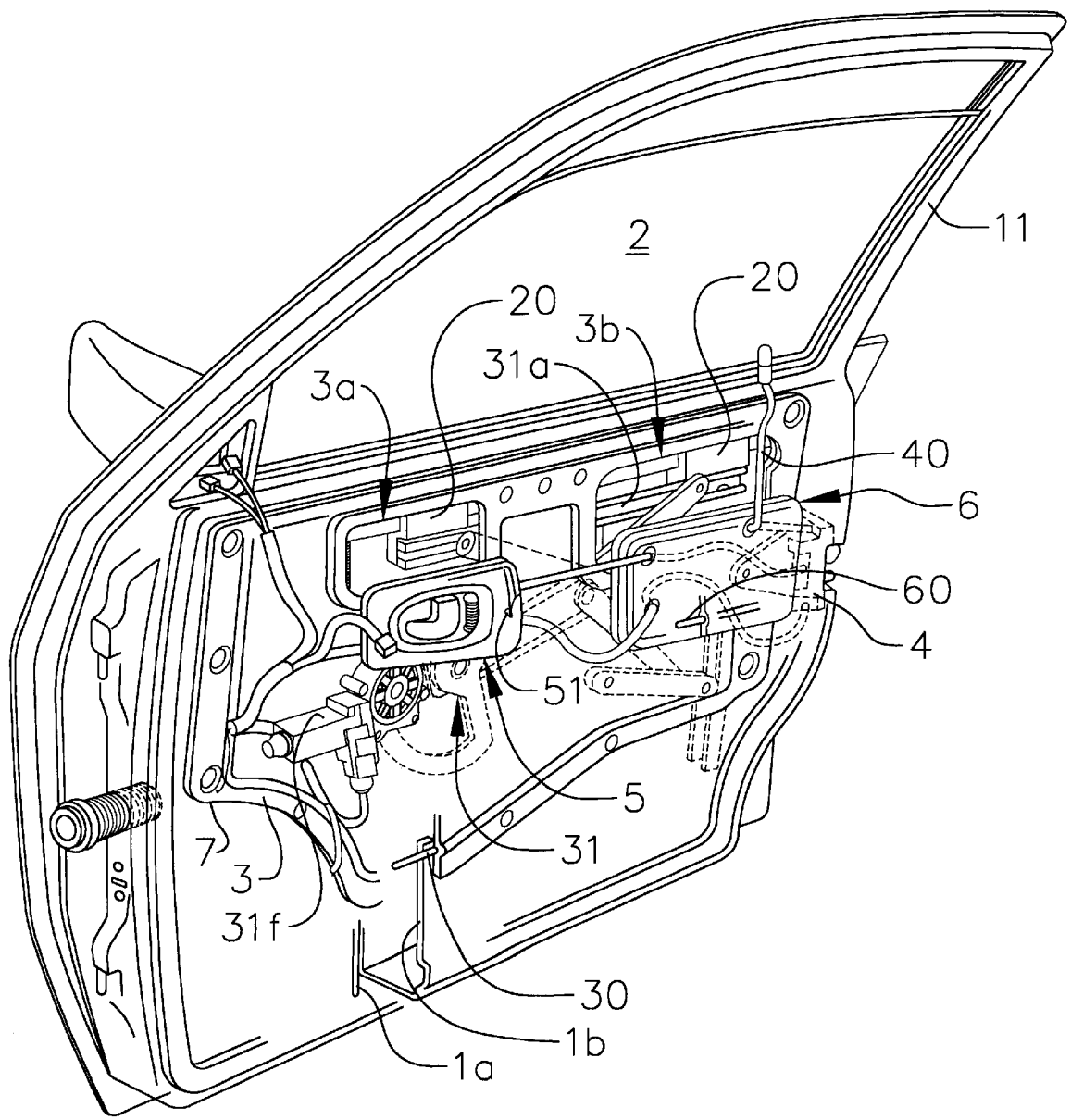
FIG. 1f is an exploded perspective view of the vehicle door in modular structure.

The perspective illustration of the vehicle door in modular structure according to FIG. 1f shows the state of the vehicle door after the connection of the window lift mechanism 31 with the window pane 2 and directly before closing the assembly openings 3a, 3b with the functional units 5,6. Furthermore, it can be clearly seen that the window lift mechanism 31 lies in the wet chamber between the outer door panel 1a and the inner door panel 1b; whereas the drive unit 31f is mounted in the dry chamber between the inner door panel 1b and the inner door trim (not shown).

Figure 2A:
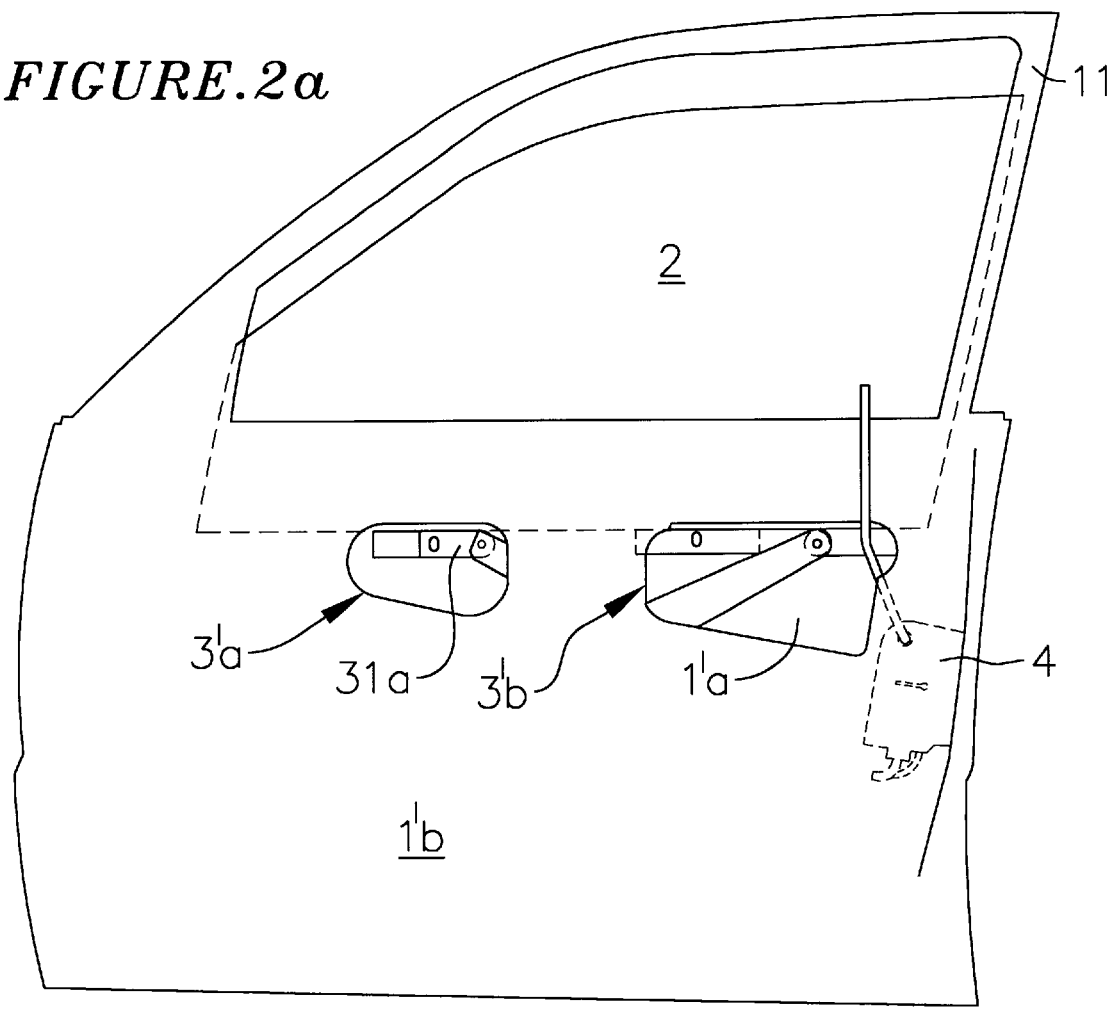
FIG. 2a is a side view of a vehicle door according to another embodiment with a practically completely closed inner door panel having only two assembly openings.
Figure 2B:
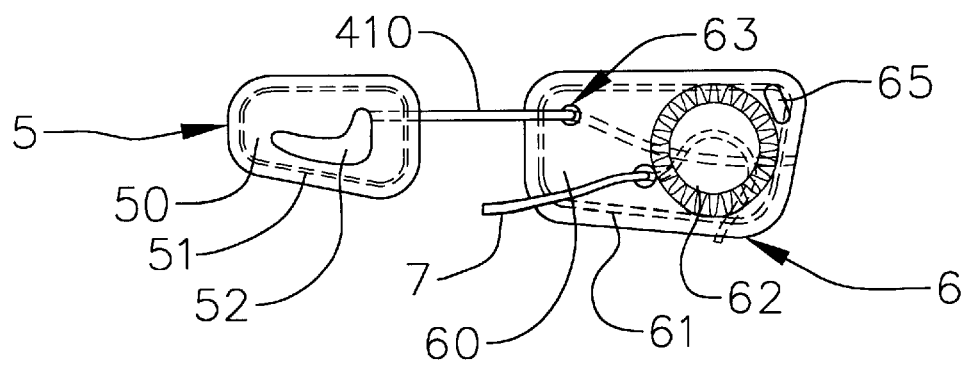

FIG. 2a shows a door body with a practically completely closed inner door panel 1'b. Only two assembly openings 3'a,3'b were formed for fitting the window lift in the inner door panel 1'b. The contours of the assembly openings 3'a,3'b and the contours of the functional units 5,6 provided for closing are matched with each other. Owing to the spatial conditions of the two functional units 5,6 through the rod linkage 410, these are preferably supplied together for assembly.

For the other features of the vehicle door, the explanations made for the embodiments of the door shown in FIGS. 1a to 1e apply here.

Although the present invention has been described with respect to particular embodiments, those skilled in the art will appreciate that the present invention may be modified without departing from the scope of the invention. Accordingly, all such modifications are intended to be included within the scope of the invention as defined by the following claims.

We claim:

1. Motor vehicle door comprising:
   an outer door panel;
   a functional unit comprising a side airbag having a support housing and a seal, the support housing having a guide for a cable;
   an inner door panel for supporting the functional unit, the inner door panel positioned adjacent to the outer door panel;
   a window lift for connecting with a window pane during assembly at a connecting location,
   wherein a portion of the window lift is located between the inner door panel and the outer door panel and the inner door panel substantially covers the portion of the window lift,
   wherein the inner door panel has an assembly opening positioned to expose the connecting location to facilitate assembling the window pane on the window lift and
   wherein the assembly opening for assembling the window pane on the window lift is closed by the functional unit.

2. Motor vehicle door according to claim 1 wherein the functional unit is preassembled in order to facilitate transport of the functional unit.

3. Motor vehicle door according to claim 1 wherein the inner door panel has a wet side in a wet chamber located between the outer door panel and the inner door panel, and wherein the inner door panel has a dry side opposite the wet side.

4. Motor vehicle door according to claim 2 wherein the at least one functional unit is positioned on the dry side of the inner door panel.

5. Motor vehicle door comprising:
   an outer door panel;
   a functional unit comprising a door lock;
   an inner door panel for supporting the functional unit, the inner door panel positioned adjacent to the outer door panel;
   a window lift for connecting with a window pane during assembly at a connecting location,
   wherein a portion of the window lift is located between the inner door panel and the outer door panel and the inner door panel substantially covers the portion of the window lift,
   wherein the inner door panel has an assembly opening positioned to expose the connecting location to facilitate assembling the window pane on the window lift and
   wherein the assembly opening for assembling the window pane on the window lift is closed by the functional unit.

6. Motor vehicle door comprising:
   an outer door panel;
   a functional unit comprising a side airbag having a support housing and a seal, the support housing having a guide for a Bowden cable;
   an inner door panel for supporting the functional unit, the inner door panel positioned adjacent to the outer door panel;
   a window lift for connecting with a window pane during assembly at a connecting location,
   wherein a portion of the window lift is located between the inner door panel and the outer door panel and the inner door panel substantially covers the portion of the window lift;
   wherein the inner door panel has an assembly opening positioned to expose the connecting location to facilitate assembling the window pane on the window lift and
   wherein the assembly opening for assembling the window pane on the window lift is closed by the functional unit.

7. Motor vehicle door comprising:
   an outer door panel;
   a functional unit comprising a side airbag having a support housing and a seal, the support housing having a guide for a rod linkage;
   an inner door panel for supporting the functional unit, the inner door panel positioned adjacent to the outer door panel;
   a window lift for connecting with a window pane during assembly at a connecting location,
   wherein a portion of the window lift is located between the inner door panel and the outer door panel and the inner door panel substantially covers the portion of the window lift,
   wherein the inner door panel has an assembly opening positioned to expose the connecting location to facilitate assembling the window pane on the window lift and
   wherein the assembly opening for assembling the window pane on the window lift is closed by the functional unit.

8. Motor vehicle door comprising:

an outer door panel;

an inner door panel adjacent the outer door panel, the inner door panel having a cut-out section;

a functional unit;

a door module for supporting the functional unit, wherein the door module is sealingly mounted to the inner door panel over the cut-out section; and a window lift for connecting with a window pane during assembly at a connecting location, wherein a portion of the window lift is located between the inner door panel and the outer door panel, the window lift being supported by the door module, wherein the door module has an assembly opening positioned to expose the connecting location to facilitate assembling the window pane on the window lift, and wherein the assembly opening is closed by the functional unit.

9. Motor vehicle door according to claim 8 wherein the inner door panel has a wet side in a wet chamber located between the outer door panel and the inner door panel, and wherein the inner door panel has a dry side opposite the wet side.

10. Motor vehicle door according to claim 9 wherein the functional unit is positioned on the dry side of the inner door panel.

11. Motor vehicle door according to claim 8 wherein the functional unit closing the assembly opening supports a padding.

12. Motor vehicle door according to claim 8 wherein the functional unit comprises a water tight seal for sealing the assembly opening.

13. Motor vehicle door according to claim 8 wherein the functional unit is an inner door handle comprising a bearing shell and a seal.

14. Motor vehicle door according to claim 8 wherein the functional unit is a side airbag comprising a support housing and a seal.

15. Motor vehicle door according to claim 14 wherein the support housing of the side airbag comprises a guide for a cable.

16. Motor vehicle door according to claim 14 wherein the support housing of the side airbag comprises a guide for a Bowden cable.

17. Motor vehicle door according to claim 14 wherein the support housing of the side airbag comprises a guide for a rod linkage.

18. Motor vehicle door according to claim 8 wherein the functional unit comprises a door lock.

19. Motor vehicle door according to claim 8 having a modular structure wherein the functional unit serving for closing the assembly opening is preassembled on a module support in a position that facilitates transport of the functional unit.

20. Motor vehicle door comprising:

an outer door panel;

a functional unit comprising a side airbag;

an inner door panel for supporting the functional unit, the inner door panel positioned adjacent to the outer door panel;

a window lift for receiving a window pane during assembly, wherein the inner door panel has an assembly opening to facilitate assembling the window pane on the window lift and wherein the assembly opening for assembling the window pane on the window lift is closed by the functional unit;

wherein the side airbag comprises a support housing having a first guide for one of a cable or linkage and a seal.

21. Motor vehicle door according to claim 20 further comprising a second guide and a third guide, the first guide for a cable, the second guide for a Bowden cable and the third guide for a rod linkage.

* * * * *

UNITED STATES PATENT AND TRADEMARK OFFICE
CERTIFICATE OF CORRECTION

PATENT NO.    : 6,076,882
DATED         : June 20, 2000
INVENTOR(S)   : Ferenc Szerdahelyi and Manfred Stenzel It is certified that error appears in the above-identified patent and that said Letters Patent is hereby corrected as shown below:

<u>Column 6,</u>
Line 4, delete "claim 2" and insert therefor -- claim 3 --.

Signed and Sealed this

Thirteenth Day of August, 2002

Attest:

JAMES E. ROGAN
Attesting Officer
Director of the United States Patent and Trademark Office